United States Patent
Ziems et al.

(10) Patent No.: US 11,177,710 B2
(45) Date of Patent: Nov. 16, 2021

(54) SYNCHRONOUS GENERATOR OF A GEARLESS WIND TURBINE AND METHOD FOR PRODUCING A SYNCHRONOUS GENERATOR, AND USE OF FORM COILS

(71) Applicant: Wobben Properties GmbH, Aurich (DE)

(72) Inventors: Jan Carsten Ziems, Aurich (DE); Jochen Röer, Ganderkesee (DE)

(73) Assignee: Wobben Properties GmbH, Aurich (DE)

( * ) Notice: Subject to any disclaimer, the term of this patent is extended or adjusted under 35 U.S.C. 154(b) by 300 days.

(21) Appl. No.: 16/300,509

(22) PCT Filed: May 2, 2017

(86) PCT No.: PCT/EP2017/060352
§ 371 (c)(1),
(2) Date: Nov. 9, 2018

(87) PCT Pub. No.: WO2017/194344
PCT Pub. Date: Nov. 16, 2017

(65) Prior Publication Data
US 2019/0229572 A1 Jul. 25, 2019

(30) Foreign Application Priority Data
May 11, 2016 (DE) ...................... 10 2016 108 712.2

(51) Int. Cl.
*H02K 1/16* (2006.01)
*H02K 3/16* (2006.01)
(Continued)

(52) U.S. Cl.
CPC ................. *H02K 3/16* (2013.01); *F03D 9/25* (2016.05); *F03D 15/20* (2016.05); *H02K 1/16* (2013.01);
(Continued)

(58) Field of Classification Search
CPC .. H02K 1/16; H02K 3/02; H02K 3/14; H02K 15/0087
See application file for complete search history.

(56) References Cited

U.S. PATENT DOCUMENTS 4,307,311 A    12/1981  Grozinger
4,315,171 A     2/1982  Schaeffer
(Continued)

FOREIGN PATENT DOCUMENTS

CL    773-2011 B    10/2011
CN    1255417 C      5/2006
(Continued)

OTHER PUBLICATIONS

U.S. Appl. No. 15/112,658, filed Jul. 19, 2016, Synchronous Generator in a Gearless Wind Turbine.

*Primary Examiner* — Ramon M Barrera
(74) *Attorney, Agent, or Firm* — Seed Intellectual Property Law Group LLP

(57) ABSTRACT

A synchronous generator of a gearless wind turbine is provided. The synchronous generator includes a rotor and a stator. The stator has a stator ring having teeth and slots arranged therebetween for receiving a stator winding. In a circumferential direction, the stator ring is divided into stator segments, each having an equal number of slots. Within a segment, the slots have a substantially equal spacing with respect to each another in the circumferential direction. In at least one connecting region of two segments, the spacing of at least two adjacent slots, which are each assigned to one of two different segments, differs from the spacing of the slots within a segment. The stator winding is formed with form coils. A method for producing a synchronous generator is provided and a use of aluminum and copper form coils in the generator is provided.

16 Claims, 4 Drawing Sheets

(51) Int. Cl.
  *H02K 3/02* (2006.01)
  *H02K 15/00* (2006.01)
  *F03D 9/25* (2016.01)
  *F03D 15/20* (2016.01)
  *H02K 3/14* (2006.01)
  *H02K 7/18* (2006.01)

(52) U.S. Cl.
  CPC ............ *H02K 1/165* (2013.01); *H02K 3/02* (2013.01); *H02K 3/14* (2013.01); *H02K 7/1838* (2013.01); *H02K 15/0037* (2013.01); *H02K 15/0087* (2013.01); *F05B 2220/7066* (2013.01); *F05B 2260/96* (2013.01); *F05B 2280/1072* (2013.01); *H02K 2213/12* (2013.01); *Y02E 10/72* (2013.01)

(56) References Cited

U.S. PATENT DOCUMENTS

| | | | |
|---|---|---|---|
| 4,990,809 A | 2/1991 | Artus et al. | |
| 5,173,651 A | 12/1992 | Buckley et al. | |
| 5,835,171 A | 11/1998 | Hanazawa et al. | |
| 6,265,804 B1 | 7/2001 | Nitta et al. | |
| 6,285,104 B1 | 9/2001 | Nashiki | |
| 6,288,471 B1 | 9/2001 | Kometani et al. | |
| 6,321,439 B1 | 11/2001 | Berrong et al. | |
| 6,605,735 B2 | 8/2003 | Kawano et al. | |
| 6,803,671 B2 | 10/2004 | Wobben | |
| 6,864,611 B1 | 3/2005 | Wobben | |
| 6,930,428 B2 | 8/2005 | Gründl et al. | |
| 7,592,733 B2 | 9/2009 | Naitou et al. | |
| 8,083,212 B2 | 12/2011 | Numajiri et al. | |
| 8,129,881 B2 | 3/2012 | Hösle | |
| 8,421,261 B2 | 4/2013 | Drews | |
| 8,610,321 B2 | 12/2013 | Stiesdal | |
| 8,629,596 B2 | 1/2014 | Germishuizen et al. | |
| 8,723,386 B2 | 5/2014 | Wolf et al. | |
| 8,803,348 B2 | 8/2014 | Groendahl et al. | |
| 8,912,704 B2 * | 12/2014 | Petter .................. | H02K 15/026 310/216.112 |
| 9,071,115 B2 | 6/2015 | Bodin et al. | |
| 9,281,731 B2 | 3/2016 | Benedict | |
| 9,590,458 B2 | 3/2017 | Chin et al. | |
| 9,812,909 B2 | 11/2017 | Petter et al. | |
| 2004/0036374 A1 | 2/2004 | Noble et al. | |
| 2004/0104638 A1 | 6/2004 | Yoneda et al. | |
| 2005/0012425 A1 | 1/2005 | Tsukamoto et al. | |
| 2006/0006757 A1 | 1/2006 | Seguchi | |
| 2009/0001840 A1 | 1/2009 | Wolf et al. | |
| 2010/0052325 A1 | 3/2010 | Perner et al. | |
| 2010/0176675 A1 | 7/2010 | Labbe et al. | |
| 2011/0260467 A1 | 10/2011 | Gudewer | |
| 2011/0266811 A1 | 11/2011 | Smadja | |
| 2011/0309712 A1 | 12/2011 | Chin | |
| 2012/0025658 A1 | 2/2012 | Watanabe et al. | |
| 2012/0074797 A1 | 3/2012 | Petter et al. | |
| 2012/0175994 A1 | 7/2012 | Flynn | |
| 2013/0088116 A1 | 4/2013 | Chin et al. | |
| 2013/0200743 A1 | 8/2013 | Okimitsu | |
| 2015/0288267 A1 | 10/2015 | Gudewer et al. | |
| 2016/0336834 A1 | 11/2016 | Diedrichs | |
| 2017/0045268 A1 | 2/2017 | Fujisue | |
| 2018/0019632 A1 | 1/2018 | Gao et al. | |
| 2019/0153957 A1 * | 5/2019 | Juretzek .............. | H02K 17/165 |

FOREIGN PATENT DOCUMENTS

| | | |
|---|---|---|
| CN | 101411038 A | 4/2009 |
| CN | 201868969 U | 6/2011 |
| CN | 102216605 A | 10/2011 |
| CN | 102386705 A | 3/2012 |
| CN | 202183662 U | 4/2012 |
| CN | 102859844 A | 1/2013 |
| CN | 102884714 A | 1/2013 |
| CN | 103210566 A | 7/2013 |
| CN | 103597712 A | 2/2014 |
| CN | 104617689 A | 5/2015 |
| DE | 1538772 B2 | 3/1977 |
| DE | 19923925 A1 | 12/2000 |
| DE | 10110466 A1 | 9/2002 |
| DE | 10340114 A1 | 3/2004 |
| DE | 102005061892 A1 | 6/2007 |
| DE | 102009015044 A1 | 11/2009 |
| DE | 102014200947 A1 | 8/2015 |
| EP | 1026814 A2 | 8/2000 |
| EP | 3252926 A1 | 12/2017 |
| GB | 2493827 A | 2/2013 |
| JP | S62181648 A | 8/1987 |
| JP | 2000287420 A | 10/2000 |
| JP | 2001510320 A | 7/2001 |
| JP | 2004064928 A | 2/2004 |
| JP | 2009189078 A | 8/2009 |
| JP | 2012016269 A | 1/2012 |
| JP | 2013524762 A | 6/2013 |
| JP | 2013162721 A | 8/2013 |
| JP | 2015211603 A | 11/2015 |
| KR | 20080089394 A | 10/2008 |
| KR | 20120098437 A | 9/2012 |
| KR | 20130027503 A | 3/2013 |
| RU | 2452578 C2 | 6/2012 |
| SU | 861715 A1 | 9/1981 |
| WO | 03073583 A1 | 9/2003 |
| WO | 2011006693 A2 | 1/2011 |
| WO | 2011012095 A2 | 10/2011 |
| WO | 2011135056 A1 | 11/2011 |
| WO | 2013174566 A2 | 11/2013 |
| WO | 2015106891 A2 | 7/2015 |
| WO | 2015155934 A1 | 10/2015 |

* cited by examiner

SYNCHRONOUS GENERATOR OF A GEARLESS WIND TURBINE AND METHOD FOR PRODUCING A SYNCHRONOUS GENERATOR, AND USE OF FORM COILS

BACKGROUND

Technical Field

The present invention relates to a synchronous generator, in particular a multipole synchronous ring generator of a gearless wind turbine. Moreover, the present invention relates to a method for producing a synchronous generator of this kind and to a use of form coils.

Description of the Related Art

Wind turbines are widely known and they generate electric current from wind by means of a generator. Modern gearless wind turbines often have a multipole synchronous ring generator with a large air gap diameter. In this case, the diameter of the air gap is at least 4 meters (m) and generally extends to almost 5 m. Composite synchronous generators can even have an air gap diameter of about 10 m.

During the operation of the wind turbine, i.e., of the synchronous generator concerned, noise is generated by vibration, and, owing to the large construction, this vibration is also transmitted to large resonant bodies, e.g., the nacelle cowling of a wind turbine, thus amplifying this noise even more. By virtue of the way they function, such synchronous generators of a gearless wind turbine are very slowly rotating generators, rotating at a typical speed of about 5 to 35 rpm. This slow speed can also contribute to promoting specific noises, especially in comparison with generators which rotate at high speeds of revolution, e.g., 1500 or 3000 rpm.

Because they are in continuous operation, such synchronous generators of gearless wind turbines and therefore also the wind turbines themselves can give rise to a continuous source of troublesome noise. Nowadays, particularly large, modern wind turbines are increasingly being set up and operated at a relatively large distance from residential areas, and any noise from the wind turbine is therefore also perceived to be less troublesome.

To reduce this noise generation, there are therefore known synchronous generators with a rotor and a stator, where the stator has a special construction in order to counteract the noise generation. For example, there is a known practice of positioning the slots and teeth by way of which a winding of the stator, namely the stator winding, is located nonuniformly, rather than uniformly, in the circumferential direction of the stator.

This ensures that rotor or runner poles distributed uniformly in the circumferential direction do not reach the corresponding teeth and slots, which are offset or staggered relative to one another, at exactly the same time during the rotary motion of the rotor. This reduces vibration, thereby also reducing noise generation by such generators and hence also by the overall wind turbine itself.

The winding of the stator of a generator of this kind is generally produced using an insulated endless round wire, which is manufactured from copper, for example. For this purpose, the wire of a phase is wound into a multiplicity of slots, each containing several windings, a phase thus being produced from a continuous piece of the wire. This winding of the stator is very laborious and must sensibly be carried out by hand in order to monitor the integrity of the wires and also of the insulation of the wire even during winding, especially at the bends.

BRIEF SUMMARY

A synchronous generator of a gearless wind turbine is proposed. The synchronous generator is, in particular, a multipole synchronous ring generator of a gearless wind turbine. Such a multipole synchronous ring generator of a gearless wind turbine has a multiplicity of stator poles, in particular at least 48 stator teeth, and often even significantly more stator teeth, in particular 96 stator teeth, for example. The magnetically active region of the generator, namely both of the rotor, which can also be referred to as a runner, and of the stator, is arranged in an annular region around the axis of rotation of the synchronous generator. Thus, in particular, a region of 0 to at least 50% of the radius of the air gap is free from materials which conduct electric current or an electric field of the synchronous generator. In particular, this internal space is completely free and, in principle, also accessible. Often, this region also accounts for more than 0 to 50% of the air gap radius, in particular up to 0 to 70% or even 0 to 80% of the air gap radius. Depending on construction, there may be a supporting structure in this interior region, but this can be of axially offset design in some embodiments.

Accordingly, the synchronous generator comprises a rotor and a stator, wherein the stator has a stator ring having teeth and slots arranged therebetween for receiving a stator winding. The stator ring is divided into stator segments in the circumferential direction. Each stator segment has the same number of slots, and, within a segment, the slots have a substantially equal spacing with respect to one another in the circumferential direction.

In a connecting region of two segments, which, in particular, corresponds to the region in which two segments are arranged adjacent to one another, are situated adjacent to one another or touch one another in the circumferential direction, the spacing of two adjacent slots, which are each assigned to one of two different segments, namely the segments which are situated adjacent to one another in this connecting region, is different from the spacing of the slots within a segment. The two slots of two different segments which are situated adjacent to one another thus have a spacing which is greater or smaller than the spacing of the slots within a segment. Moreover, the stator winding is formed with form coils. In this context, form coils comprise, in particular, an electric conductor which has been given a predetermined shape in a plurality of windings and has two terminals, by means of which the form coil can be connected to further form coils in order to form a phase by means of a plurality of series connected coils of the generator.

Hitherto, it has been the case that form coils were not economical for a stator of this kind owing to the different spacings of the slots, since form coils are only economical if they all have the same shape within one stator. However, in the case of synchronous generators with different slot spacings, this advantage is at first sight not available since form coils of different sizes have to be selected to enable them to be arranged in the slots spaced apart at different distances, and, at the same time, power losses must be expected.

However, it has been recognized that, in the case where the stator is divided into a plurality of segments, each having the same number of slots, it is always possible to provide a particular number of form coils, in particular single-layer form coils, within one segment, and it is thus possible to use form coils of the same shape despite different slot spacings. In this case, therefore, the form coils of the segments are connected to one another instead of providing form coils which are also inserted in slots across segments. Thus, a relatively advantageous synchronous generator with asymmetrically distributed slots can be obtained without using expensive manual winding involving endless wires.

According to one embodiment, the form coils each have two legs, where the legs are connected to one another by two winding overhangs, which are also referred to as end windings, and the terminals are preferably arranged in the region of one of the winding overhangs. Apart from the region of the terminals, the legs and winding overhangs of all the form coils of the stator winding have the same shape. This ensures that, in production, the form coils can all be pre-shaped on a substantially identical fixture and hence a large number of form coils can be produced, thereby further reducing production costs.

According to another embodiment, the legs of each form coil are arranged in the stator in an identical radial region of the stator. Here, a radial region corresponds to a region between two circles of different radii extending around the stator axis. Accordingly, therefore, all the legs of all the form coils in the stator advantageously have the same spacing with respect to a central point of the stator. This arrangement of the form coils corresponds to a single-layer arrangement, wherein just a single leg of a form coil is arranged in each slot. This single-layer arrangement of the form coils in the slots furthermore ensures that legs of the same form coil do not have to be placed in slots of adjacent segments in the connecting regions of two segments—as is the case with otherwise frequently used two-layer windings. In the case of a two-layer arrangement of the form coils, for example, it would namely also be necessary to arrange form coils across segments. This would in turn necessitate form coils of different shapes, namely those which are within a segment and those which have a shape that enables cross-segment slots to be connected to one another.

According to another embodiment, each segment has six, or a multiple of six, form coils. According to this embodiment, six of the terminals of the form coils of a segment are furthermore connected to six terminals of the form coils of a segment arranged ahead of it in the circumferential direction and to six terminals of the form coils of a segment situated after it in the circumferential direction. This results in six phases of the stator, thus allowing the generator to be operated as a six-phase generator. Vibration is thereby furthermore reduced since the torque fluctuation is reduced by virtue of six phases in place of the otherwise customary three phases.

According to another embodiment, the connection of two of the terminals in each case is established with a connecting element which has a U shape. In this arrangement, the ends of the U shape are each connected to one terminal of different form coils. U-shaped connecting elements are particularly advantageous since they can be arranged in series in the circumferential direction in an arrangement rotated through 180 degrees relative to one another and thus one or more ends of the U shape can extend into the central space between two ends of the U shape of a different connecting element, thus making possible a space-saving construction.

According to another embodiment, form coils of different materials are used for the stator. In this case, form coils with a first resistivity are inserted at least into the slots, the spacing of which is less than the spacing of the slots within a segment. In the majority of the remaining slots, however, a form coil with a higher resistivity than the first resistivity is used.

During operation, the heat generation in the legs of the form coils is directly correlated with the resistivity of the material from which the form coils are produced. This means that, as the resistivity increases, heat generation during the flow of a current through the form coil also increases.

Precisely in the region of the slots in which two legs of form coils are very close together, it is therefore necessary to maintain lower heat generation than in the other slots in order to keep the overall heat generation in the stator below certain limits. It therefore has a particularly advantageous effect to use form coils with a lower resistivity at least in the slots which have a small spacing with respect to one another than in slots which have a larger spacing.

According to another advantageous embodiment, legs of a form coil produced with or from copper are inserted into the slots, the spacing of which is less than the spacing of the slots within a segment, and a leg of a form coil produced with or from aluminum is inserted into each of the majority of the remaining slots. Aluminum can be procured at low cost in very large quantities and is, at the same time, easy to process. It is therefore particularly advantageous to insert form coils made of aluminum into the majority of the slots. Copper can also be procured in sufficient quantities. Although copper is more expensive to procure than aluminum, copper has a lower resistivity, and therefore the use of copper is advantageous, at least in slots situated very close together, since the temperature behavior and the associated advantage with the heat generation of a stator compensates for the higher procurement price.

According to another embodiment, at least one terminal of a form coil containing or composed of aluminum is connected to at least one terminal of a form coil containing or composed of copper. The connection is established by means of a connecting element which is produced from a copper-aluminum alloy in accordance with the first alternative above. An alloy of this kind composed of copper and aluminum is used to establish a secure connection between the terminals of the form coils made of different materials.

According to another alternative, the connecting element is a connecting element composed of both conductor materials. Thus, the connecting element is composed of copper on one side and of aluminum on the other side, for example, wherein the two materials are joined together, e.g., by cold pressure welding, friction stir welding or pressure brazing or pressure welding.

According to the further procedure, the copper and aluminum coils, i.e., two different form coils, are connected to one another by a connecting element which is composed of aluminum and, during the manufacture of the copper coil, has already been connected to the copper coil by cold pressure welding, friction stir welding, pressure brazing or pressure welding before the equipping of the stator.

According to another embodiment, the stator ring of the stator is joined together from a plurality of stator ring parts at at least two locations, in each case particularly in the connecting region of two segments, in particular of two adjacent slots, which are each assigned to one of two different segments and the spacing of which is greater than the spacing of the slots within a segment.

Accordingly, therefore, the stator ring is produced from a plurality of stator ring parts. These are premanufactured, for example, wherein the form coils can be inserted into the slots of the stator ring parts during the process of premanufacture itself. It is only at the location of use that the individual stator ring parts are then connected to one another. It is advantageous if the stator ring is divided precisely where two segments, the outer slots of which have a greater spacing in the assembled state than the remaining slots of a segment, abut. These locations for the division of the stator ring are particularly advantageous since the large slot spacing means that no particularly narrow teeth of the stator are formed, which could be damaged during transportation, for example. A robust construction of the stator is thus ensured. The divisibility simultaneously allows the transportation of particularly large stators.

According to another embodiment, the form coils comprise one of the following shapes, in each case in the region of the end winding thereof. According to a first form of the form coils of this embodiment, outside the stator ring, the legs are offset in opposite directions and extend in parallel as far as a 180 degree bend which connects the legs. As an alternative, outside the stator ring, the legs are bent in the same direction with different spacings and then extend in parallel as far as a 180 degree bend which connects the legs. Here, the bend of the two legs is in the same direction and has an angle in a range of from 0 to 90 degrees. According to another alternative embodiment, the bend is provided in the same direction with an angle of 90 degrees. Coils shaped in this way advantageously lead to single-layer form coils, which can therefore be arranged in the same radial region of the stator.

Moreover, the invention relates to a method for producing a synchronous generator, in particular according to any of the abovementioned embodiments. According to the method, six, or a multiple of six, form coils, are inserted into each segment. Furthermore, six of the terminals of the form coils of a segment are connected to six terminals of the form coils of a segment arranged ahead of it in the circumferential direction and to six terminals of the form coils of a segment situated after it in the circumferential direction. This advantageously gives rise to six phases of in each case continuous electric leads or strands through the stator of a synchronous generator. For this purpose, it is possible to use form coils which allow relatively advantageous production of a synchronous generator in comparison with a hand-wound synchronous generator while, at the same time, different slot spacings are possible in order to reduce noise generation by the generator during operation.

According to one embodiment of the method, the form coils are wound before being inserted into the slots by winding one or more wires, in particular flat wires, arranged in parallel around a winding core, which is preferably formed from two mandrels. The resulting coil is spread apart until the desired spacing of the two legs corresponding to the spacing of the slots within a segment is obtained. The end windings are then bent by fixing sections of the coil in fixtures and then moving these fixtures relative to one another until the desired shape of the form coil is obtained by plastic deformation. Simple premanufacture of high numbers of form coils of the same shape is thus possible.

According to another embodiment of the method, in the case of offset form coils, the coil in the region of the winding overhang is offset first in the opposite direction before the legs are spread apart. This ensures that the spacing of the legs of the coil is not accidentally changed during the offsetting process.

According to another embodiment of the method, different form coils are connected by means of U-shaped connecting parts by cold welding, pressure brazing or friction stir welding. It is thereby possible to dispense with contact rings, by means of which form coils are usually connected. Space-saving construction, especially in respect of the depth of the stator, is thus possible.

The invention furthermore relates to the use of aluminum form coils and copper form coils in a generator. Thus, aluminum form coils and copper formed coils are accordingly used in the same stator of a generator, for example, to produce more uniform heat distribution in the stator. Particularly in a stator which has asymmetric distribution of the slots, copper coils are therefore preferably used in slots which are comparatively close together, and aluminum coils are used in the remaining slots. At the same time, a cost saving is therefore possible by using aluminum, while the copper coils are used only in regions in which temperatures which are prohibited or should be avoided during operation would otherwise be reached due to high resistivities of aluminum.

BRIEF DESCRIPTION OF THE SEVERAL VIEWS OF THE DRAWINGS

Further embodiments will become apparent from the illustrative embodiments described in greater detail in the figures.

DETAILED DESCRIPTION

Figure 1:
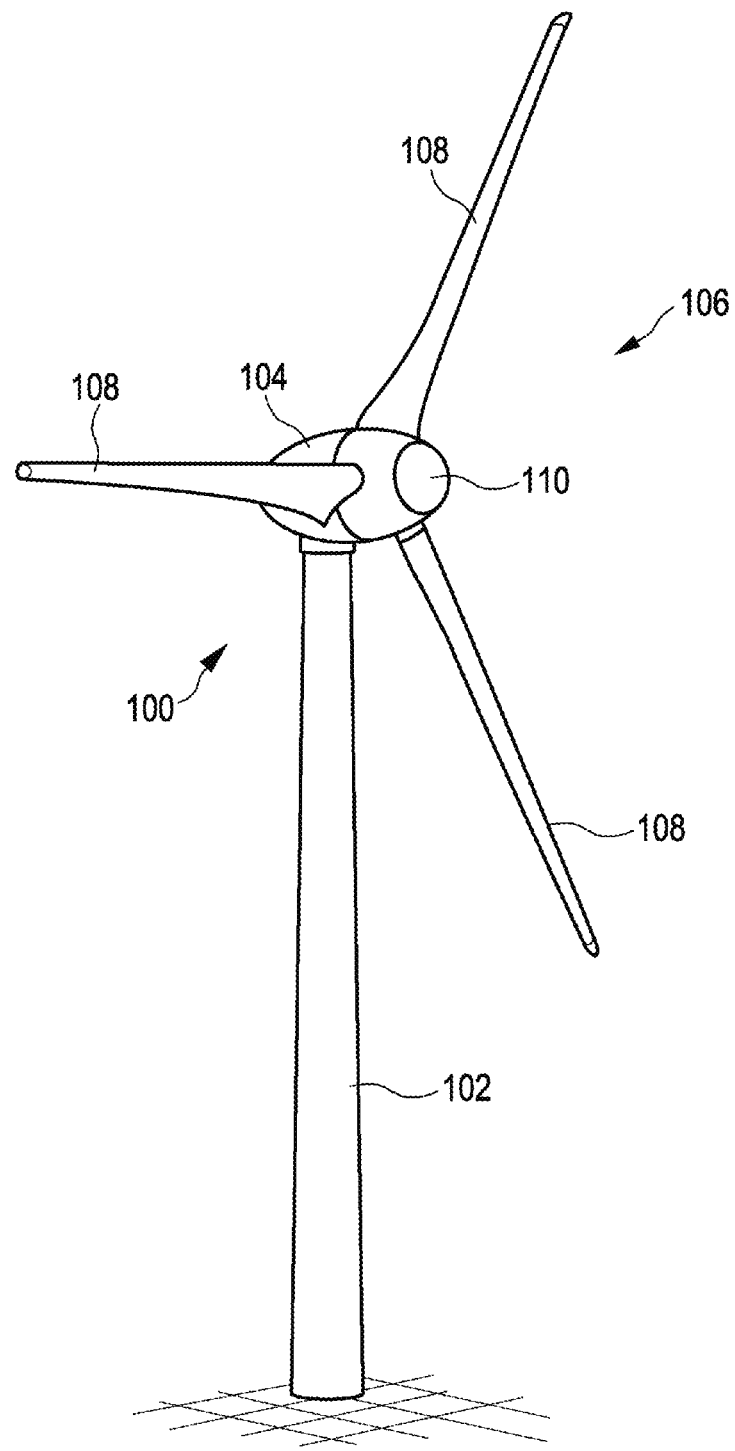
FIG. 1 shows a wind turbine.

FIG. 1 shows a schematic illustration of a wind turbine according to the invention. The wind turbine 100 has a tower 102 and a nacelle 104 on the tower 102. An aerodynamic rotor 106 with three rotor blades 108 and a spinner 110 is provided on the nacelle 104. During the operation of the wind turbine, the aerodynamic rotor 106 is set in rotation by the wind and thus also rotates a rotor or runner of a generator, which is coupled directly or indirectly to the aerodynamic rotor 106. The electric generator is arranged in the nacelle 104 and generates electric energy. The pitch angles of the rotor blades 108 can be changed by means of pitch motors at the rotor blade roots 108b of the respective rotor blades 108.

Figure 2:
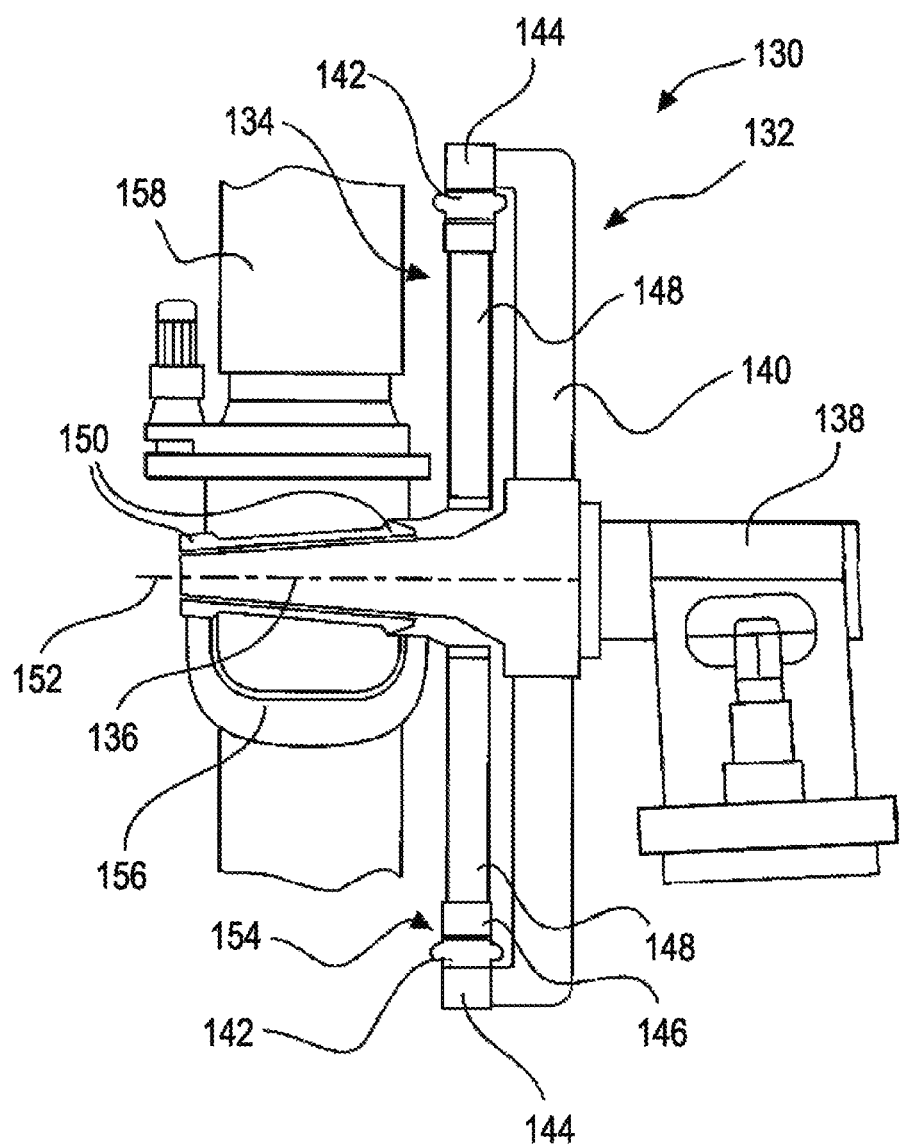
FIG. 2 shows a schematic side view of a synchronous generator designed as a ring generator.

FIG. 2 shows a generator 130 schematically in a side view. It has a stator 132 and an electrodynamic rotor 134 mounted rotatably relative to the latter and is attached to a machine support 138 by means of its stator 132 via an axle journal 136. The stator 132 has a stator support 140 and laminated stator cores 142, which form stator poles of the generator 130 and are attached to the stator support 140 via a stator ring 30.

The electrodynamic rotor 134 has rotor pole shoes 146, which form the rotor poles and are mounted so as to be rotatable on the axle journal 136 about the axis of rotation 152 by means of a rotor support 148 and bearings 150. The laminated stator cores 142 and the rotor pole shoes 146 are separated only by a narrow air gap 154, which is a few millimeters thick, in particular less than 6 mm, but has a diameter of several meters, in particular more than 4 m.

The laminated stator cores 142 and the rotor pole shoes 146 each form a ring and, together, are also annular, with the result that the generator 130 is a ring generator. In line with its intended purpose, the electrodynamic rotor 134 of the generator 130 rotates together with the rotor hub 156 of the aerodynamic rotor, of which initial portions of rotor blades 158 are indicated.

Figure 3:
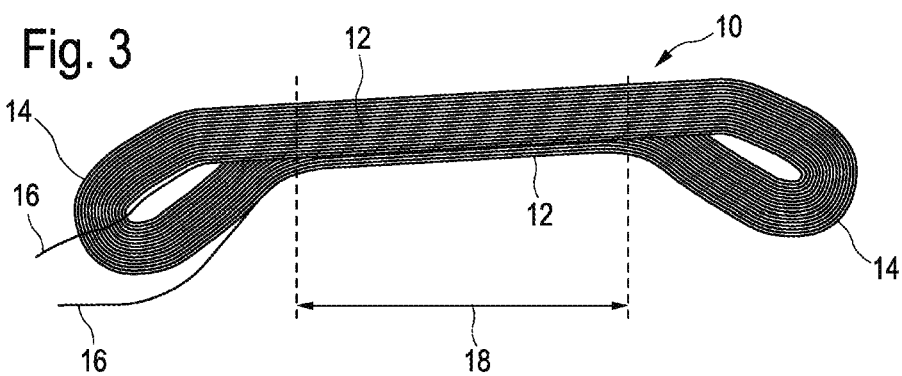
FIG. 3 shows a form coil of one illustrative embodiment of the synchronous generator according to the invention.

FIG. 3 shows a first illustrative embodiment of a form coil 10 for the synchronous generator 130. The form coil 10 has two legs 12. Moreover, the coil 10 has two end windings 14. Two terminals 16 are illustrated in the region 18 of the end winding 14 illustrated on the left-hand side. The region 18 of the form coil 10, namely the two legs 12 in this region 18, are subsequently inserted into the slots 32 of one and the same segment of a stator 132 of a synchronous generator 130. The segments just mentioned are described below in connection with the description of FIGS. 7 and 8. The end windings 14 correspond to bends in the legs 12 in order to connect the two legs 12 to one another.

Figure 4:
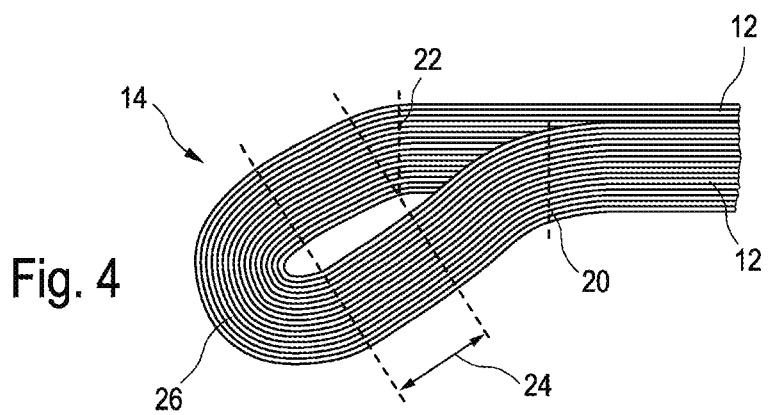
FIG. 4 shows an enlargement of the end winding of the coil from FIG. 3.

FIG. 4 shows an enlarged illustration of one of the end windings 14 of the form coil 10 from FIG. 3. This end winding 14 corresponds to the end winding illustrated on the right-hand side in FIG. 3, where the rear view is illustrated here as compared with FIG. 3. The end winding 14 comprises the legs 12 being bent in the same direction with different spacings, namely according to spacing 20, on the one hand, and spacing 22, on the other hand. In a region 24, the two bent legs 12 once again run parallel and are connected to one another by a 180 degree bend 26. Here, the bend in the legs 12 in the same direction is about 40 degrees.

Figure 5:
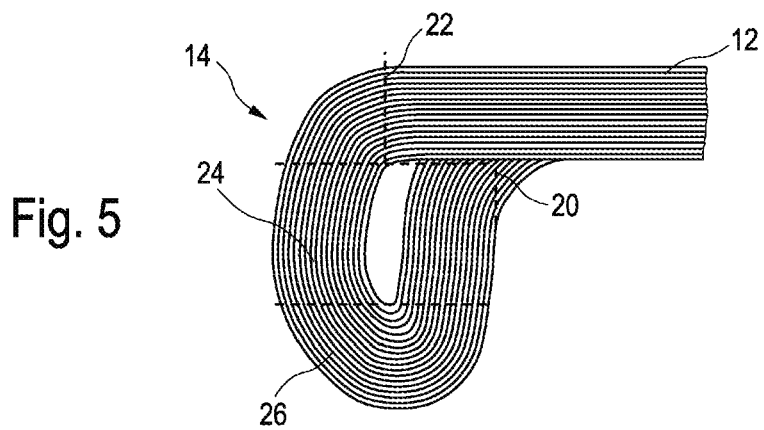
FIG. 5 shows an end winding wound in a different way from the illustrative embodiment in FIGS. 3 and 4.

An alternative embodiment of the form coil 10 is illustrated in FIG. 5, in which the end winding 14 is bent through 90 degrees according to spacings 20, 22. By means of these illustrated form coils 10, it is possible to insert any desired number of these coils 10 formed in this way into the slots 32 of a stator 132 without the individual windings touching and nevertheless to arrange the legs 12 at the same radial distance from or in the same radial region with respect to the center of a stator 132.

Figure 6:
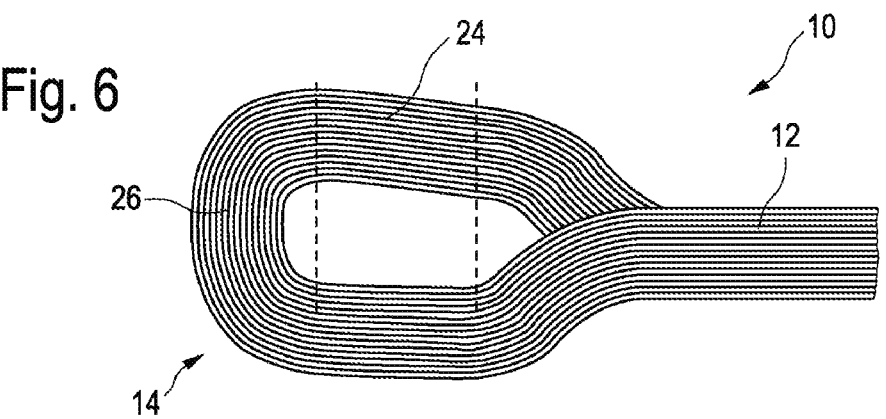
FIG. 6 shows another embodiment of the shape of a form coil.

FIG. 6 shows yet another illustrative embodiment of an end winding 14 of a form coil 10, in which the legs 12 are offset in opposite directions with the same spacing, i.e., initially being bent through 90 degrees in opposite directions and then being bent again through 90 degrees in the same direction. A region 24 is thereby likewise produced, in which the two offset regions of the legs 12 run substantially parallel. Once again, a 180 degree bend 26 is provided, which connects the two legs 12.

Figure 7:
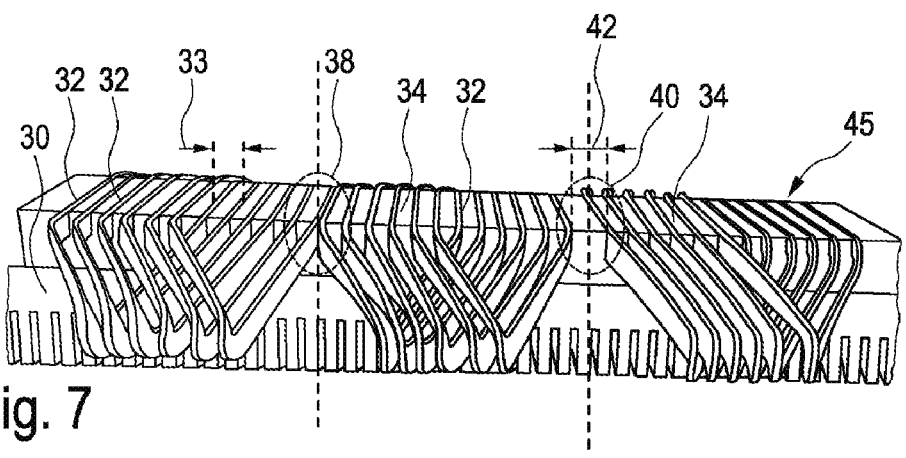
FIG. 7 shows three segments of a stator ring shown by way of example in side view.

FIG. 7 shows, by way of example, a detail of a stator ring 30, which is shown without curvature for greater clarity. The stator ring 30 has slots 32 and teeth 34. Here, three segments 36 are illustrated. Form coils 10 are inserted into the slots 32 of the segments 36. Each of the segments 36 has six form coils 10. The legs 12 of the form coils 10 and the slots 32 within a segment 36 each have the same spacing 33 with respect to one another. In connecting region 38 and in connecting region 40, however, the slots 32 have a spacing 42 which is different from the spacing 33 of the slots 32 within a segment 36. In connecting region 38, for example, the spacing of the two slots 32 is equal to zero and is thus smaller than the spacing 33 of the slots 32 within a segment 36. In connecting region 40, on the other hand, the spacing 42 of the slots 32 is approximately twice as wide as the spacing 33 of the slots 32 within a segment. In the illustration, the upper side 45 of the stator ring 30 corresponds to the radially inner side of the stator 132.

Figure 8:
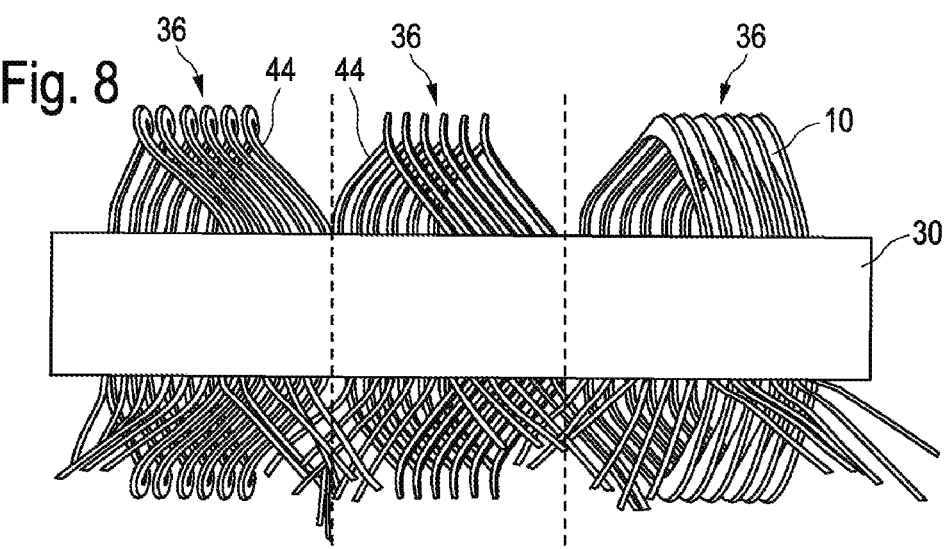
FIG. 8 shows an illustrative view of three segments of a stator in a view of the stator from the outside.

FIG. 8 shows a view of the stator 132 radially from the outside. Here too, by way of example, only the region with three segments 36 is illustrated. According to the illustrative embodiment shown in FIG. 8, the two form coils 44 are produced from copper. The remaining form coils 10 are produced from aluminum. By virtue of the copper form coils 44, the legs 12 of which are very close together in the connecting region 38, 40 of the two segments 36, there is less heat generation during operation than if these two coils were manufactured from aluminum, since copper has a lower resistivity than aluminum. With the use of aluminum form coils and copper form coils, a relatively advantageous stator 132 or synchronous generator 130 can be produced, which has advantageous properties in respect of heat distribution.

The invention claimed is:

1. A synchronous generator of a gearless wind turbine, comprising:
   a rotor, and
   a stator including a stator ring having teeth and slots arranged between the teeth for receiving a stator winding, wherein the stator ring is divided, in a circumferential direction, into a plurality of segments, wherein the plurality of segments have an equal number of slots, wherein slots within a segment of the plurality of segments have a substantially equal spacing with respect to each other in the circumferential direction, wherein, in a connecting region of two different segments of the plurality of segments, a first spacing between two adjacent slots, which respectively belong to the two different segments, differs from a second spacing between the slots within the segment, and wherein the stator winding includes form coils,
   wherein each segment of the plurality of segments has six form coils, or a multiple of six form coils, wherein each form coil has a first terminal and a second terminal, wherein six first terminals of the segment are connected to six second terminals of a second segment arranged ahead of the segment in the circumferential direction and six second terminals of the segment are connected to six first terminals of a third segment situated after the segment in the circumferential direction.

2. The synchronous generator as claimed in claim 1, wherein the form coils each have two legs, the two legs are connected to one another by two winding overhangs, and the form coils each have two terminals in a region of one of the two winding overhangs, wherein, apart from the two terminals, the two legs and the two winding overhangs of the form coils of the stator winding have substantially the same shape.

3. The synchronous generator as claimed in claim 2, wherein the two legs of each form coil are arranged in the stator in an identical radial region of the stator.

4. The synchronous generator as claimed in claim 1, wherein the stator ring is joined together from a plurality of stator ring parts at at least two locations, a location of the at least two locations being in the connecting region, wherein the first spacing between the two adjacent slots, which respectively belong to the two different segments is greater than the second spacing between the slots within the segment.

5. The synchronous generator as claimed in claim 1, wherein a form coil of the form coils, in a region of a winding overhang, has legs, outside the stator ring, that are offset in opposite directions and extend in parallel as far as a 180 degree bend which connects the legs.

6. The synchronous generator as claimed in claim 1, wherein a form coil of the form coils, in a region of a winding overhang, has legs, outside the stator ring, that are bent in the same direction with different spacings and extend in parallel as far as a 180 degree bend which connects the legs, wherein the bend has an angle in a range of 0 to 90 degrees in the same direction.

7. The synchronous generator as claimed in claim 1, wherein a form coil of the form coils, in a region of a winding overhang, has legs, outside the stator ring, that are bent in the same direction with different spacings and extend in parallel as far as a 180 degree bend which connects the legs, wherein the bend has an angle of 90 degrees in the same direction.

8. A synchronous generator of a gearless wind turbine, comprising:
 a rotor, and
 a stator including a stator ring having teeth and slots arranged between the teeth for receiving a stator winding, wherein the stator ring is divided, in a circumferential direction, into a plurality of segments, wherein the plurality of segments have an equal number of slots, wherein the slots within a segment of the plurality of segments have a substantially equal spacing with respect to each other in the circumferential direction, wherein, in a connecting region of two different segments of the plurality of segments, a first spacing between two adjacent slots, which respectively belong to the two different segments, differs from a second spacing between the slots within the segment, and wherein the stator winding includes form coils,
 wherein the form coils are made from different materials, wherein the first spacing is less than the second spacing, and wherein an adjacent slot of the two adjacent slots in the connecting region receives a leg of a first form coil having a first resistivity, and the slots within the segment receive a leg of a second form coil having a second resistivity that is higher than the first resistivity.

9. The synchronous generator as claimed in claim 8, wherein the first form coil is a copper form coil and the second form coil is an aluminum form coil.

10. A method for making a synchronous generator, comprising:
 inserting, into each segment of a plurality of segments of a stator ring of the synchronous generator, a plurality of form coils, a number of the plurality of form coils of each segment of the plurality of segments is six or a multiple of six, each plurality of form coils having a respective plurality of first terminals and a respective plurality of second terminals, wherein the synchronous generator comprises a rotor, and a stator including the stator ring having teeth and slots arranged between the teeth for receiving a stator winding, wherein the stator ring is divided, in a circumferential direction, into the plurality of segments, wherein the plurality of segments have an equal number of slots, wherein slots within a segment of the plurality of segments have a substantially equal spacing with respect to each other in the circumferential direction, wherein, in a connecting region of two different segments of the plurality of segments, a first spacing between two adjacent slots, which respectively belong to the two different segments, differs from a second spacing between the slots within the segment, and wherein the stator winding includes the plurality of form coils, wherein each segment of the plurality of segments has six form coils, or a multiple of six form coils, wherein each form coil has a first terminal and a second terminal, wherein six first terminals of the segment are connected to six second terminals of a second segment arranged ahead of the segment in the circumferential direction and six second terminals of the segment are connected to six first terminals of a third segment situated after the segment in the circumferential direction,
 connecting the plurality of first terminals of a first segment of the plurality of segments to the plurality of second terminals of the second segment of the plurality of segments arranged ahead of the first segment in the circumferential direction, and
 connecting the plurality of second terminals of the first segment of the plurality of segments to the plurality of first terminals of the third segment of the plurality of segments arranged after the first segment in the circumferential direction.

11. The method as claimed in claim 10, wherein the plurality of form coils are each wound before being inserted into the slots by winding one or more wires arranged in parallel around a winding core and a resulting coil is spread apart until a desired spacing of two legs corresponding to a spacing of the slots within the segment is obtained, and wherein winding overhangs are bent by fixing sections of a form coil in fixtures and moving the fixtures relative to each another until a desired shape of the form coil is obtained by plastic deformation.

12. The method as claimed in claim 11, wherein the plurality of form coils are offset form coils, and a coil in the region of a winding overhang is offset first in the opposite direction before the two legs are separated.

13. The method as claimed in claim 10, comprising:
 connecting the plurality of first terminals of the first segment to the respective plurality of second terminals of the second segment by cold welding, pressure brazing or friction stir welding U-shaped connecting parts.

14. The method as claimed in claim 11, wherein the one or more wires are flat wires and the winding core is formed from two mandrels.

15. The method as claimed in claim 11, wherein the winding core is formed from two mandrels.

16. The method as claimed in claim 10, comprising:
 connecting the plurality of second terminals of the first segment to the respective plurality of first terminals of the third segment by cold welding, pressure brazing or friction stir welding U-shaped connecting parts.

* * * * *